United States Patent
Matubara et al.

[11] Patent Number: 5,222,395
[45] Date of Patent: Jun. 29, 1993

[54] THERMAL TYPE FLOWMETER

[75] Inventors: Naoki Matubara; Hiroyuki Katougi, both of Tokyo, Japan

[73] Assignee: Oval Engineering Co., Ltd., Tokyo, Japan

[21] Appl. No.: 713,188

[22] Filed: Jun. 10, 1991

[30] Foreign Application Priority Data

Jun. 15, 1990 [JP] Japan .............................. 2-63431[U]

[51] Int. Cl.$^5$ ................................................. G01F 1/68
[52] U.S. Cl. .................................................. 73/204.18
[58] Field of Search ........... 73/204.15, 204.16, 204.18, 73/204.25, 204.27

[56] References Cited

U.S. PATENT DOCUMENTS

| | | | |
|---|---|---|---|
| 2,552,017 | 5/1951 | Schwartz et al. | 73/204.15 |
| 2,726,546 | 12/1955 | King, Jr. | 73/204.15 |
| 3,020,760 | 2/1962 | Schnoll | 73/204.25 |
| 3,648,518 | 3/1972 | Hans et al. | 73/204.15 |
| 3,827,299 | 8/1974 | Welland | 73/204.12 |
| 4,255,968 | 3/1981 | Harpster | 73/204.18 |
| 4,843,881 | 7/1989 | Hubbard | 73/204.16 |

FOREIGN PATENT DOCUMENTS

| | | | |
|---|---|---|---|
| 3241312 | 10/1988 | Japan | 73/204.25 |
| 2-141621 | 5/1990 | Japan | 73/204.25 |

*Primary Examiner*—Michael T. Razavi
*Assistant Examiner*—R. L. Biegel
*Attorney, Agent, or Firm*—Jordan & Hamburg

[57] ABSTRACT

A heat-conductive stream pipe has an upstream side and a downstream side temperature-sensing element having resistance wires wound round the pipe at a certain distance there-between to assure that there will be no thermal influence with each other. A control means controls a bridge circuit including a ground point at one end and a connecting point at the other end of each of the temperature-sensing elements so as to keep the temperature difference between the upstream side and the downstream side temperature-sensing elements at a constant level. An adjustable auxiliary heater is placed on the stream pipe at the downstream side near the downstream side temperature-sensing element. The mass flow of the fluid is determined by the voltage measured at the connecting point of the downstream side temperature-sensing element.

1 Claim, 2 Drawing Sheets

THERMAL TYPE FLOWMETER

BACKGROUND OF THE INVENTION

The present invention relates to a thermal type flowmeter and, more particularly, to a thermal type flowmeter which has a high resolution of power in sensing a small amount of flow of a liquid and which is also capable of sensing a reverse flow.

While a fluid to be measured flows as a laminar or turbulent current through a stream pipe, a boundary layer of flow is formed along the inner wall surface of the stream pipe. When the stream pipe is heated by a heat-sensitive resistance wire wound thereon, the heat is carried over into the fluid by heat conduction through the stream pipe wall and through the boundary layer of the fluid's flow. The heat conductivity of the stream pipe is determined as a variable value depending upon the composition of its material and the amount of heat transferred through its surface, and the heat conductivity of the boundary layer of the fluid's flow is determined as a value relating to the specific amount of heat in the fluid to be measured. Accordingly, the heat conductivity of the stream pipe is calculated from such data as its make-up (i.e. the material it is made of), the pipe's diameter etc. On the other hand, the heat conductivity of the fluid, is determined by its density and flow rate. The thermal-type flowmeter can be used as a simple mass flowmeter which, being based upon the above-mentioned operating principle, can determine the mass flow of a fluid of a known kind without hindering the fluid from flowing.

A conventional thermal type flowmeter comprises a heat-conductive stream pipe provided with an upstream side and a downstream side temperature-sensing element having resistance wires wound round the pipe at a certain distance there-between to assure that there will be no thermal influence with each other, and a control means to control a bridge circuit including a ground point at one end and a connecting point at the other end of each of the temperature-sensing elements so as to keep the temperature difference between the upstream side and the downstream side temperature-sensing elements at a constant level, and which determines a mass flow of the fluid from the voltage measured at the connecting point of the downstream side temperature-sensing element.

However the conventional thermal type flowmeter as mentioned above has a non-linear relationship between the flow rate and the sensor output, which show a small inclination and an inflection point in the small range of flow wherein the flow rate approaches zero thereby indicating the decreased sensitivity of the sensor output in the small range.

SUMMARY OF THE INVENTION

It is an object of the present invention to provide a thermal type flowmeter which is highly sensitive even in the range of a small measurement of flow and that is capable of obtaining a high sensor output through the full range of the measurement of flow with no inflection point.

It is another object of the present invention to provide a thermal type flowmeter which is possible to detect a reverse flow by sensing a change in the sensor output signal.

DESCRIPTION OF THE PREFERRED EMBODIMENTS

Figure 1:
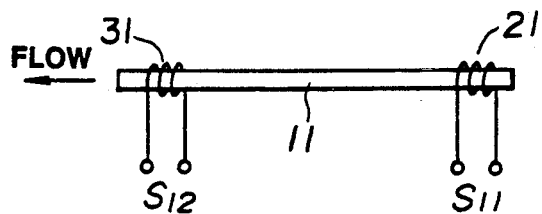
FIG. 1 is a construction view of a conventional thermal type flowmeter.

FIG. 1 is a construction view of a conventional thermal type flowmeter. In FIG. 1, the numeral 11 indicates a heat-conductive stream pipe of a small diameter and usually is made of stainless steel through which a fluid, to be measured, flows in the direction indicated by an arrow. Said stream pipe 11 has an upstream side temperature-sensing element 21 and a downstream side temperature-sensing element 31 which are heat-sensitive resistance wires $S_{11}$ and $S_{12}$ made of nickel alloy or platinum. Both the resistance wires are wound round the stream pipe and spaced at a certain distance from each other so that no thermal influence may occur between them. The resistance $S_{11}$ of the upstream side temperature-sensing element 21 has a value about one order larger than that of the resistance $S_{12}$ of the downstream side temperature-sensing element 21. Therefore, a larger current for heating the fluid is fed to the downstream side temperature-sensing element 31.

Figure 2:
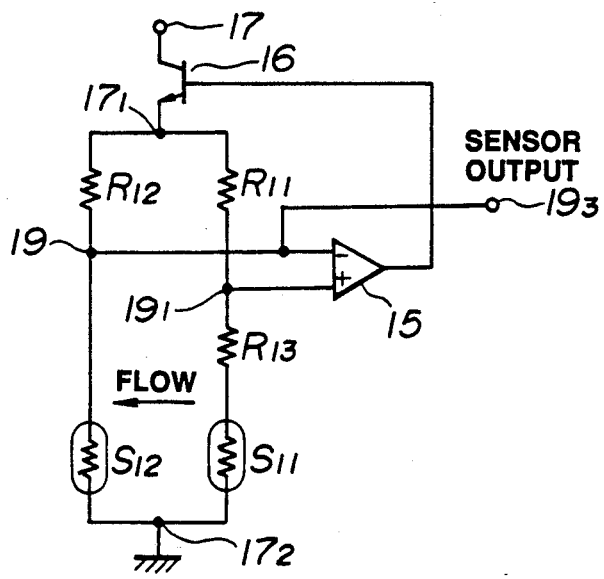
FIG. 2 shows a schematic circuit diagram of the conventional thermal type flowmeter shown in FIG. 1.

FIG. 2 is a schematic circuit diagram of the above-mentioned conventional thermal type flowmeter. The resistors $S_{11}$ and $S_{12}$ are active resistors forming two arms of a bridge circuit having connecting portions 19, $19_1$ and a round end $17_2$. The bridge circuit includes further resistors $R_{11}$, $R_{12}$ and $R_{13}$. The resistor $R_{13}$ has a value for causing the downstream side temperature-sensing element 31 to have a certain temperature difference in relation to the upstream side temperature-sensing element 21. The bridge circuit is composed of a combination of serially connected resistors $R_{11}$, $R_{13}$, $S_{11}$ and serially connected resistors $R_{12}$, $S_{12}$. The connecting portion 19 and $19_1$ are connected respectively to an inverting input and a non-inverting input of an amplifier 15. The numeral 16 designates an NPN type transistor which is connected with its collector to the terminal 17, and at its emitter to the power source side connecting point $17_1$ of the bridge circuit and at its base to the output side of the amplifier 15. A sensor signal, proportional to the mass flow rate is formed on the basis of the voltage at the connecting point 19 and sent out from a terminal $19_3$. The above-mentioned circuit is intended to feed back a part of the signal to the amplifier 15 and the transistor 16 so that the potential difference between the connecting portions 19 and $19_1$ becomes about zero, thereby the temperature difference between the upstream side temperature-sensing element 21 and the downstream side temperature-sensing element 31 may be kept at a constant value corresponding to the resistor $R_{13}$. Since the voltage drop of the resistor $S_{12}$ is proportional to the heat used for heating the fluid's flow to maintain a constant value to the difference in temperature, the sensor output at the terminal $19_3$ corresponds to the mass flow of the fluid.

Figure 3:
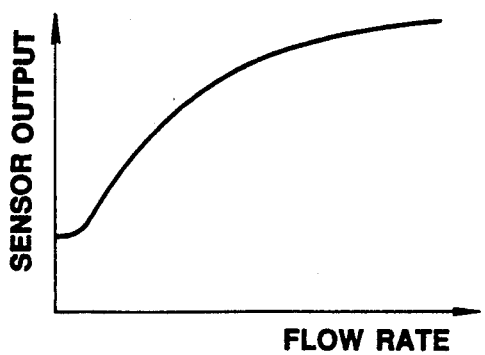
FIG. 3 shows a flow output characteristic curve of a conventional thermal type flowmeter.

FIG. 3 is a characteristic curve showing a non-linear relationship between the rate of flow and the sensor output for a conventional thermal type flowmeter.

Referring to FIG. 3, there is shown a characteristic curve indicating the rate of flow vs. sensor output relationship, which has a small inclination and an inflection point in the small range of flow wherein the flow rate approaches zero thereby indicating the decreased sensitivity of the sensor output in said range. This can be explained as follows: Since current is fed to the downstream side temperature-sensing element 31 so as to keep the temperature difference with respect to the upstream side temperature-sensing element 21 at a constant value, the heat carried away by the fluid's flow decreases as the fluid's flow rate decreases, resulting in rising the temperature at the downstream side and thereby the heating current passing through the resistor $S_{12}$ increases and, at the same time, the temperature at the upstream side of the stream pipe is also increased by heat conduction from the downstream side temperature-sensing element 31. Consequently, the fluid flowing into the pipe portion, heated by the downstream side temperature-sensing element 31, has been affected by heat conduction and the heating power of the downstream side temperature-sensing element 31 is decreased resulting in decreasing of the temperature change of the downstream side temperature-sensing element 31, due to the heat transfer from said element 31 to the fluid's flow.

In view of the foregoing, the present invention was made to provide a thermal type flowmeter which is highly sensitive even in the range of a small measurement of flow and that is capable of obtaining a high sensor output through the full range of the measurement of flow with no inflection point, and which comprises a heat-conductive stream pipe provided with an upstream side and a downstream side temperature-sensing element having resistance wires wound round the pipe at a certain distance there-between to assure that there will be no thermal influence with each other, and a control means to control a bridge circuit including a ground point at one end and a connecting point at the other end of each of the temperature-sensing elements so as to keep the temperature difference between the upstream side and the downstream side temperature-sensing elements at a constant level, and which will determine a mass flow of the fluid from the voltage measured at the connecting point of the downstream side temperature-sensing element and which has an auxiliary heater with an adjustable temperature and placed on the stream pipe from the downstream side near the downstream side temperature-sensing element.

Figure 4:
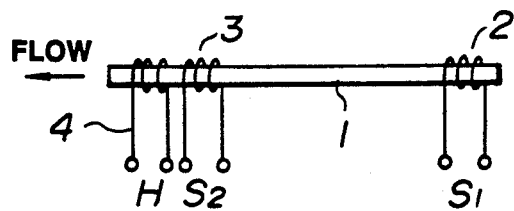
FIG. 4 is a construction view of a thermal type flowmeter embodied in the present invention.

FIG. 4 is a construction view of a thermal type flowmeter embodying the present invention. In FIG. 4, numeral 1 indicates a heat-conductive stream pipe which usually is a small diameter pipe made of stainless steel, numeral 2 indicates an upstream side temperature-sensing element which is a heat-sensitive slender wire made of nickel alloy or platinum acting as a resistor $S_1$ and wound round the upstream side of the stream pipe 1. Numeral 3 designates a downstream side temperature-sensing element which is a heat-sensitive slender wire made of nickel alloy or platinum acting as a resistor $S_2$ and wound round the downstream side of the stream pipe 1 being separated from the upstream side temperature-sensing element 2 by enough distance to assure that there is no thermal influence on said upstream side element 2. Numeral 4 is an auxiliary heater formed of a heat-sensitive slender wire acting as a resistor H wound round the stream pipe in the downstream side near the downstream side temperature-sensing element 3. The resistor $S_1$ of the upstream side temperature-sensing element 2 is about one order larger than the resistor $S_2$ of the downstream side temperature-sensing element 2, therefore most of the electric current for heating the fluid can flow toward the downstream side of the temperature-sensing element 3.

Figure 5:
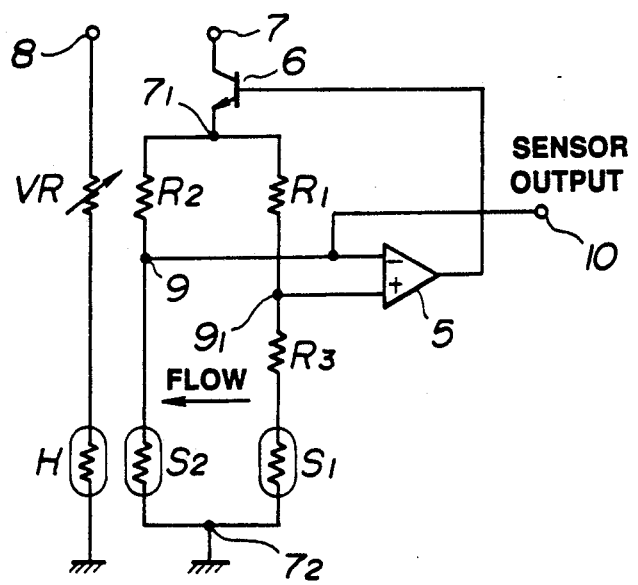
FIG. 5 is a schematic circuit diagram of the thermal type flowmeter shown in FIG. 4.

Referring now to FIG. 5, there is shown a schematic circuit diagram of the thermal type flowmeter according to the present invention, in which the resistors $S_1$ and $S_2$ are connected respectively at one end to a ground point 72 and at the other end to a series of resistors $R_3$, $R_1$ (for resistor $S_1$) and a resistor $R_2$ (for resistor $S_1$), thereby a bridge circuit is formed, in the arms of which resistors $R_1$, $R_3+S_1$, $R_2$ and $S_2$ are included, and resistors $S_1$ and $S_2$ are used as active resistors. These resistors serve to give a constant temperature difference to the downstream side temperature-sensing element 3 in relation to the upstream side temperature-sensing element 2. An amplifier 5 has two input connections 9 and $9_1$ which represent an inverse input and a non-inverse input respectively. NPN type transistor 6 has a collector connected to a power supply terminal 7, an emitter connected to a connecting point $7_1$ of the bridge circuit power source, and a base connected to the output side of the amplifier 5. A rheostat VR connected to a heating power supply terminal 8 is used for adjusting the heating current to be supplied to the auxiliary heating device 4. A sensor output terminal 10 is provided for sensing a value at the connecting portion 9, which represents the mass flow being proportional to the electric power for heating the downstream side temperature-sensing element. As is apparent from the above-mentioned circuit diagram, a temperature difference between the upstream side temperature-sensing element 2 and the downstream side temperature-sensing element 3 is kept at a constant value corresponding to the resistor $R_3$ by controlling the transistor in such a way that the input voltages of the amplifier 5 through the connecting points 9 and $9_1$ of the bridge circuit may be almost equal to each other, and furthermore when the flow rate is small and near zero, i.e. in a small range of the flow's measurement, the rheostat may be used to adjust the heating power of the auxiliary heater 4 so that the sensor output is decreased to a minimum. Heating the auxiliary heater 4 decreases the electric power to be supplied to the downstream side temperature-sensing element 3, i.e. the upstream portion of the downstream side temperature-sensing element 3 on the stream pipe is not heated thereby the possibility of the temperature rising at the element 3 due to heat being transferred from the upstream side at a small rate of flow is eliminated and on the contrary the temperature of said element 3 is lowered because of the heat absorption of the flowing fluid. In such a condition the bridge circuit operates to increase the electric power to be supplied, thereby increasing the sensor output.

Figure 6:
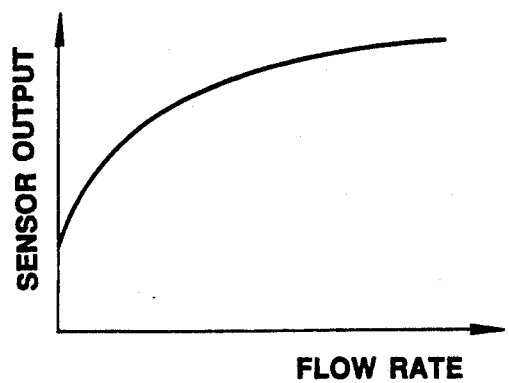
FIG. 6 shows a flow output characteristic curve of a thermal type flowmeter embodied in the present invention.

FIG. 6 shows the relationship between the flow and sensor output of a thermal type flowmeter according to the present invention. The characteristic curve obtained shows that the output evenly and continuously (with no inflection point) increases as the flow of the fluid increases.

By using an auxiliary heater 4, according to the present invention, it becomes also possible to detect a reverse in the flow of the fluid. Namely, if the fluid flows in a reverse direction, the heat generated by the auxiliary heater 4, shown in FIG. 1, is transferred to the downstream side temperature-sensing element 3, thereby the temperature of said element 3 rises and the input voltage of the bridge circuit is decreased by the balancing action of said circuit. Thereby the sensor output is reduced. The reverse flow of the fluid can be detected by sensing a change in the sensor output.

As is apparent from the foregoing description, the thermal type flowmeter, according to the present invention, is adapted to attain an output that is characteristically continuously increasing through the range from a smaller to a larger flow, with a remarkable improvement in the small flow's range. Consequently, the measurement of the flow's range can be effectively widened and the correction for linearity simplified. In the thermal type flowmeter, according to the present invention, the adoption of such simple means as an auxiliary heater of wire wound round a stream pipe also makes it possible to detect a reverse flow by sensing a change in the sensor output signal.

We claim:

1. A thermal-type flowmeter comprising:
   a type of heat-conductive stream pipe for allowing measurable fluid to flow therethrough;
   an upstream side temperature-sensing element and a downstream side temperature sensing element, said elements being each comprised of a temperature-sensing source of resistance wound around the stream pipe and spaced at a certain distance from each other thereby assuring that there will be no thermal influence between them;
   said sensing elements being connected in separate adjacent first and second legs of a bridge circuit having a ground point to which said first and second legs are connected, said bridge circuit having third and fourth legs connected to separate ones of said first and second legs respectively, and a connection point at the junction of the third and fourth legs;
   a control means connected to said connecting point to control current in said bridge circuit so as to maintain a constant temperature difference between the upstream side temperature-sensing element and the downstream side temperature-sensing element and to determine the mass of flow of the fluid from the voltage at the junction of the first and third legs of said bridge circuit;
   said flowmeter improvement comprising an auxiliary heater in series with a variable resistor to adjust the heating temperature mounted downstream of and adjacent to the downstream side temperature-sensing element so as to improve flow rate resolution at low flow rates.

* * * * *